United States Patent
Plondke et al.

(10) Patent No.: US 9,785,434 B2
(45) Date of Patent: Oct. 10, 2017

(54) FAST MINIMUM AND MAXIMUM SEARCHING INSTRUCTION

(75) Inventors: Erich J. Plondke, Austin, TX (US);
Lucian Codrescu, Austin, TX (US);
Mao Zeng, Austin, TX (US);
Swaminathan Balasubramanian, Austin, TX (US); David J. Hoyle, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 1722 days.

(21) Appl. No.: 13/241,673

(22) Filed: Sep. 23, 2011

(65) Prior Publication Data

US 2013/0080490 A1  Mar. 28, 2013

(51) Int. Cl.
 G06F 7/00  (2006.01)
 G06F 9/30  (2006.01)
 G06F 7/544  (2006.01)
 G06F 17/18  (2006.01)

(52) U.S. Cl.
 CPC .......... *G06F 9/30021* (2013.01); *G06F 7/544* (2013.01); *G06F 9/30036* (2013.01); *G06F 17/18* (2013.01)

(58) Field of Classification Search
 None
 See application file for complete search history.

(56) References Cited

U.S. PATENT DOCUMENTS

| | | | |
|---|---|---|---|
| 4,597,053 A | 6/1986 | Chamberlin | |
| 4,774,688 A | 9/1988 | Kobayashi et al. | |
| 5,187,675 A | 2/1993 | Dent et al. | |
| 5,457,645 A | 10/1995 | Suzuki | |
| 5,726,923 A | 3/1998 | Okumura et al. | |
| 5,991,785 A | 11/1999 | Alidina et al. | |
| 6,085,208 A | 7/2000 | Oberman et al. | |
| 6,948,056 B1 * | 9/2005 | Roth et al. | 712/300 |
| 7,434,034 B2 | 10/2008 | Selvaggi et al. | |
| 2004/0148320 A1 | 7/2004 | Zabarski et al. | |
| 2007/0192572 A1 | 8/2007 | Zabarski et al. | |

FOREIGN PATENT DOCUMENTS

| | | |
|---|---|---|
| CN | 1466715 A | 1/2004 |
| CN | 1491042 A | 4/2004 |
| CN | 1766833 A | 5/2006 |
| JP | 2004510245 A | 4/2004 |
| JP | 2009059187 A | 3/2009 |
| WO | 0227475 A2 | 4/2002 |

OTHER PUBLICATIONS

International Search Report and Written Opinion—PCT/US2012/056960—ISA/EPO—May 31, 2013.

* cited by examiner

*Primary Examiner* — Michael D Yaary
(74) *Attorney, Agent, or Firm* — Qualcomm Incorporated

(57) ABSTRACT

An apparatus, system and method of determining an extremum are disclosed. A reference location identifier and a reference extremum are coupled. An input extremum of an input data set is determined and a corresponding location identifier of the input extremum is also determined. The input extremum is compared with the reference extremum to determine an output extremum and output location identifier, based on the comparison.

29 Claims, 4 Drawing Sheets

CONVENTIONAL (SECOND APPROACH)

FAST MINIMUM AND MAXIMUM SEARCHING INSTRUCTION

FIELD OF DISCLOSURE

Disclosed embodiments are directed to minimum and maximum searching operations. More particularly, exemplary embodiments are directed to instructions for searching a minimum/maximum value and corresponding location identifier or address of the minimum/maximum value in an array.

BACKGROUND

Data processing applications often include functions for determining minimum or maximum values (referred herein as, "extremum," or "extreme value") in a given data set. For example, multimedia applications such as image processing, video compression, noise reduction, or motion estimation may require determination of extreme values in a two dimensional array of pixel data. Digital signal processors may search for extreme values in a sampled set of frequencies in a frequency spectrum. Other applications are known in the art which utilize the calculation of extreme values in a multi-dimensional array. Moreover, the applications may also utilize information regarding the location of the extreme value within the multi-dimensional array.

Specialized instructions are typically employed in data processing systems for searching extreme values in data sets stored as vectors or two dimensional arrays. The data set which is subjected to the search may reside in a memory system associated with the data processor. In the case of data sets stored as two dimensional arrays, a first approach may utilize instructions to read the data elements from the two dimensional array, one row at a time, and perform a search for an extreme value within each row. The extreme value can be found by walking through the row, comparing each data element with a running value indicating a current extreme value, and updating the running value if necessary, and wherein the running value at the end of all such comparisons within a row is the extreme value of the row. Alternately, the extreme value may be determined by a pair-wise tree type reduction of extreme values of data elements in the row (this technique is explained further below with reference to computation of extreme value of vector 106 of FIG. 1). Once the extreme value of each row is calculated by any suitable technique, a global extremum from the calculated extreme values for each row may be determined, in order to establish the extremum of the two dimensional array. Instructions may then search through the two dimensional array for the occurrence of the extremum so determined, in order to find the address of the extremum within the two dimensional array.

There are drawbacks to the above first approach of searching for extreme values. Firstly, the data processing system must provide additional temporary storage space for storing the intermediate calculations of extreme values within each row. Secondly, the above method comprising the steps of calculating the extreme value within a row; calculating the global extremum; and then searching for a location of the global extremum within the two dimensional array incurs considerable wastage of system resources in terms of the number of instructions used for the entire operation, temporary storage space and latency of the entire operation. Thirdly, a major drawback of the first approach is the necessity of having to search through the two dimensional array for the occurrence of the global extremum, once the global extremum has been determined. This search may require reading each row of the two dimensional array and comparing the data elements of the row with the global extremum to determine which row of the two dimensional array contains the determined global extremum. Moreover, intervening read/write operations to any of the rows within the two dimensional array must be held in abeyance until the entire operation is completed.

Some processing systems may adopt a second approach to overcome the drawbacks of the first approach. FIG. 1 is a schematic illustration of the second approach. A description of the second approach is provided below for the case where an extreme value is a maximum value. The approach is similar for the case where an extreme value is a minimum value.

With reference to FIG. 1, there is shown a two dimensional array 100 of two rows, 102 and 104. Each row, 102 and 104, is a vector comprising four data elements, 102a-102d and 104a-104d respectively. In a first stage (Stage 1) of determining a maximum value of the array 100, a lane-wise maximum is calculated for each pair of data elements in the same column as shown. A vector instruction, such as, a single instruction multiple data (SIMD) type instruction may be used for performing such vector operations. Each element of vector 106, i.e. 106a-106d now contains the maximum value in each column of array 100. For example, 106a is the maximum value of data elements 102a and 104a, and so on.

Stage 2 marks the onset of calculating a global maximum. Stage 2 begins by first computing intermediate maximum values 108a/b and 108c/d, such that 108a/b is the maximum value of 106a and 106b, and 108c/d is the maximum value of 106c and 106d. Next, the maximum value of 108a/b and 108c/d is computed and determined to be the global maximum 110 of array 100. This type of pair-wise reduction of the vector to a single value, such as the global maximum 110, is known in the art as a tree type reduction. Skilled persons will also recognize that for arrays with larger number of rows, the vector 106 comprising lane-wise maximum values may be determined by dividing the array into pairs of rows similar to 102 and 104, computing intermediate lane-wise maximum vectors for each pair of rows, and repeating the process with the intermediate lane-wise maximum vectors until a global maximum is calculated. Accordingly, by dividing the array and performing computations in parallel using SIMD type instructions, the global extremum may be calculated in a faster and more efficient manner than the first approach.

However, stage 3 of the second approach shares a major drawback of the first approach. Stage 3 comprises the step of searching for the occurrence of the global maximum 110 in array 100. Like in the first approach, this step is computationally intensive and wasteful on system resources.

Accordingly, there is a need in the art for techniques which overcome the drawbacks of the first and second approaches, and provide for fast and efficient searching of extreme values in a multi-dimensional array, along with determining the location of occurrence of the extreme value within the array.

SUMMARY

Exemplary embodiments of the invention are directed to systems and methods for fast searching of minimum/maximum values and corresponding location identifiers/addresses of the minimum/maximum values.

For example, an exemplary embodiment is directed to a method of determining an extremum comprising, coupling a reference location identifier and a reference extremum. The method comprises determining an input extremum of an input data set and determining a corresponding location identifier of the input extremum. Comparing the input extremum with the reference extremum leads to determining an output extremum and output location identifier, based on the comparison.

Another exemplary embodiment is directed to a system comprising a reference extremum, a reference location identifier of the reference extremum and an input data set. The system comprises logic configured to determine an input extremum, as the extremum of the input data set. The system also comprises logic configured to determine an input location identifier as the location identifier of the input extremum, and logic configured to compare the input extremum with the reference extremum to determine an output extremum. In exemplary embodiments, the system further comprises logic configured to select one of the input location identifier and the reference location identifier as the output location identifier, based on the comparison.

Yet another exemplary embodiment is directed to an apparatus for determining an extremum comprising means for coupling a reference location identifier and a reference extremum, and means for determining an input extremum of an input data set. The system comprises means for determining a corresponding location identifier of the input extremum, and means for comparing the input extremum with the reference extremum to determine an output extremum and output location identifier, based on the comparison.

Another exemplary embodiment is directed to a non-transitory computer readable storage medium comprising instructions, which when executed by a processor, causes the processor to perform operations for determining an extremum of a data set, wherein the instructions are operable to: couple a reference location identifier and a reference extremum; determine an input extremum of an input data set; determine a corresponding location identifier of the input extremum; and compare the input extremum with the reference extremum to determine an output extremum and output location identifier, based on the comparison.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
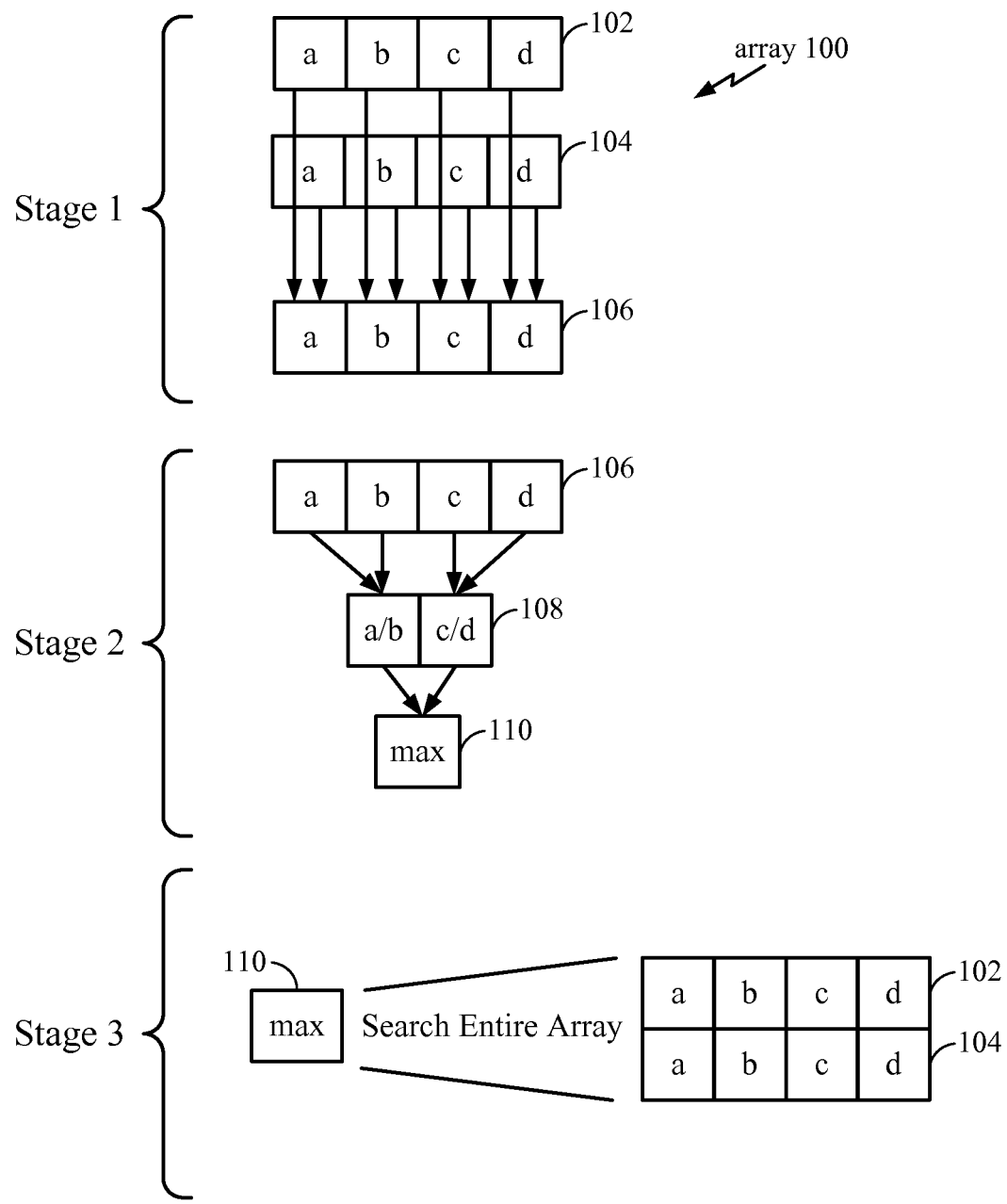
FIG. 1 is a schematic illustration of a conventional extreme value searching system and method.

Aspects of the invention are disclosed in the following description and related drawings directed to specific embodiments of the invention. Alternate embodiments may be devised without departing from the scope of the invention. Additionally, well-known elements will not be described in detail or will be omitted so as not to obscure the relevant details of the various embodiments.

The word "exemplary" is used herein to mean "serving as an example, instance, or illustration." Any embodiment described herein as "exemplary" is not necessarily to be construed as preferred or advantageous over other embodiments. Likewise, the term "embodiments" or "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Exemplary embodiments include techniques for fast searching of an extreme value in a data set. Further, embodiments include instructions and architectural support for fast searching of an extreme value in a data set and also efficiently tracking a location identifier or address of the extreme value. Disclosed embodiments maintain a reference extreme value and its corresponding location identifier during the course of searching for a global extremum in the data set. The reference extreme value and its corresponding location identifier are appropriately updated during the course of the search, such that a global extremum and the location identifier of the global extremum are almost simultaneously made available at the end of the search, without requiring an additional step of searching through the data set for the occurrence of the global extremum.

Figure 2:
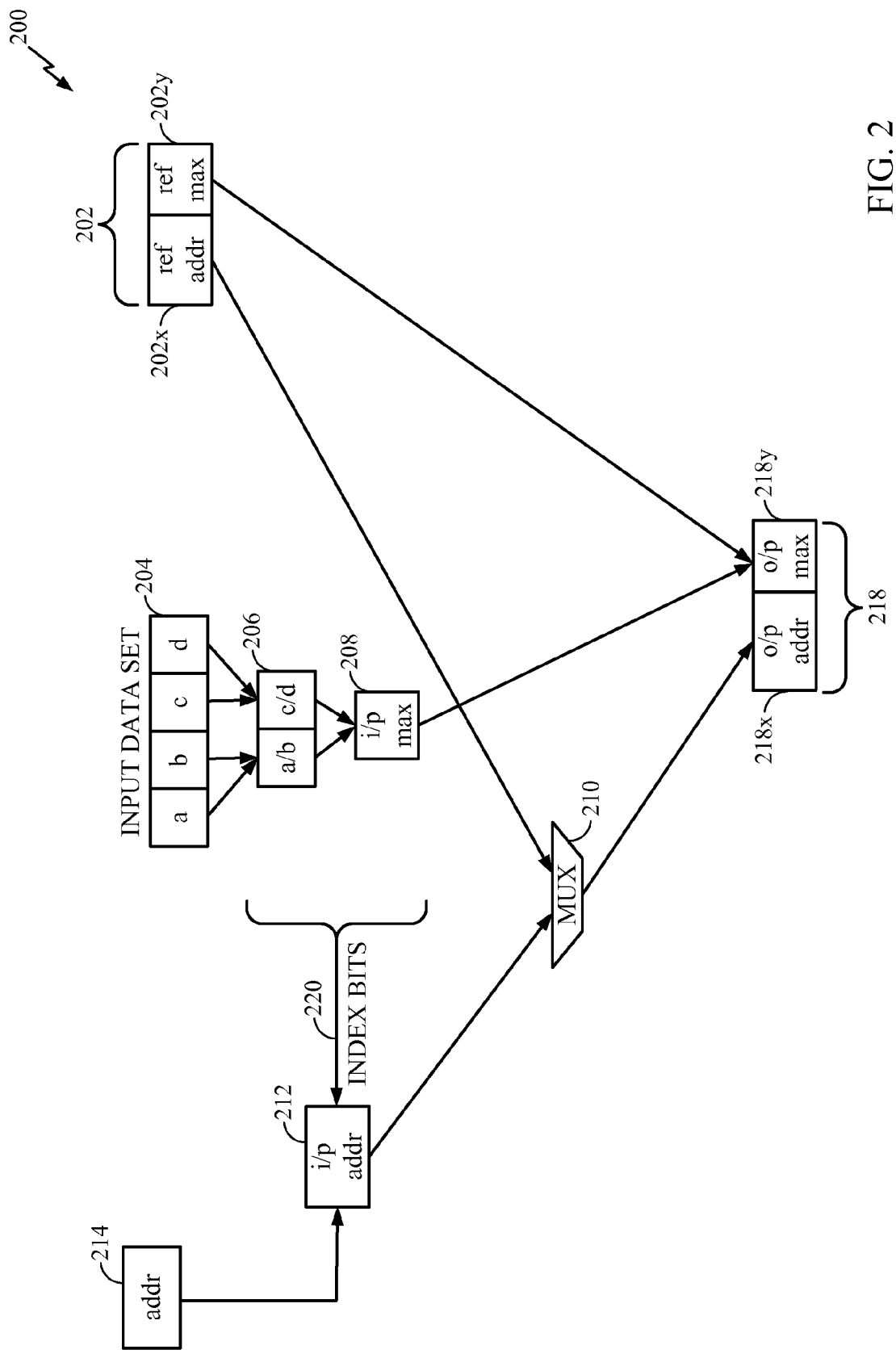
FIG. 2 is a schematic illustration of an implementation of a maximum value searching instruction according to an exemplary embodiment.

An exemplary embodiment will now be described with reference to FIG. 2. FIG. 2 is a schematic illustration of system 200 implementing a fast maximum searching instruction in accordance with an exemplary embodiment. System 200 may be a part of a processing system such as a general purpose processor, a digital signal processor (DSP), application specific integrated circuit (ASIC), a field programmable gate array (FPGA) or other programmable logic or processing entity. System 200 may be implemented using dedicated hardware for the maximum searching instruction, or may be implemented as part of hardware used to support other instructions. Further, a fully or partially customized instruction set may be defined to comprise the fast maximum searching instruction on system 200. It will also be appreciated that the techniques described herein can be easily extended to fast minimum searching instructions with no loss of generality.

With continuing reference to FIG. 2, register 202 comprises the fields reference address 202$x$ and reference maximum value 202$y$, as shown. The fields 202$x$ and 202$y$ may be initialized to zero or a predetermined constant value, or to an address of the occurrence of a global maximum value, and corresponding global maximum value from a previous fast maximum searching instruction. It will be understood that the implementation of register 202 is not limited to that of a single register, but may be implemented as a pair of registers comprising the fields 202$x$ and 202$y$, or any other suitable implementation consistent with the disclosed techniques. Further, the term "register" as used herein, is not restricted to a register which is part of a register file, but may refer to any storage medium such as a flip-flop.

Now will be described the operation of system 200 in a steady state wherein register 202 has been appropriately initialized. An input vector is obtained from a two dimensional data array or a memory system (not shown), and stored in register 204. Register 204 is shown as a vector comprising four data elements 204$a$-204$d$. As an example, register 204 may be 64-bits wide (possibly formed by two 32-bit registers), and each data element 204$a$-204$d$ may be 16-bits wide.

Next, the maximum value of the data elements 204$a$-204$d$ is computed as the input maximum value 208. In one embodiment, the 16-bit input maximum value 208 of register 204 is computed in a tree type reduction as shown in FIG. 2. First, the intermediate maximum values 206$a/b$ and 206$c/d$ are computed, such that 206$a/b$ is the maximum value of data elements 204$a$ and 204$b$, and 206$c/d$ is the maximum value of data elements 204$c$ and 204$d$. Computing the intermediate maximum values, such as 206$a/b$ and 206$c/d$ can be performed using known techniques. For example, the data elements 204$a$ and 204$b$ are first compared to determine which one of the data elements is the maximum, and then the maximum of the two data elements 204$a$ and 204$b$ is selected as the intermediate maximum value 206$a/b$. This process of comparison and selection may be implemented as follows, wherein 204$a$ and 204$b$ are each assumed to be 16-bit signed numbers. The difference in values between data elements 204$a$ and 204$b$ (204$a$ minus 204$b$) is calculated using an adder configured to perform subtraction. If, for example, the sign bits (most significant bits) of both data elements 204$a$ and 204$b$ are zero, then it is known that both data elements 204$a$ and 204$b$ are positive numbers. If the sign bit of the difference is 1, then it is determined that the difference is negative, or in other words, data element 204$a$ is a positive number whose value is less than the positive number, data element 204$b$. Accordingly, a multiplexer, controlled by the sign bit of the difference, may be used to select data element 204$b$, and store the same, as the intermediate maximum value 206$a/b$.

Returning to FIG. 2, once intermediate maximum values 206$a/b$ and 206$c/d$ are computed, input maximum value 208 is determined as the maximum value of 206$a/b$ and 206$c/d$. It will be appreciated that intermediate values 206$a/b$ and 206$c/d$ may be efficiently stored as two 16-bit fields of a single 32-bit register. Similarly, input maximum value 208 may also be stored in a 16-bit field of a 32-bit register.

Parallel to the above described steps of determining the input maximum value 208, the location of occurrence of the input maximum value 208 in register 204 is also tracked. For example, a location of each data element 204$a$-204$d$ in register 204 may be indexed by using index bits 220. For example, byte indexes of locations of data elements 204$a$-204$d$ in register 204 may be as follows: "000": 204$a$; "010": 204$b$; "100": 204$c$; and "110": 204$d$. In each step of the tree type reduction to obtain input maximum value 208, the index bits 220 are tracked. Thus, if for example, the value stored in data element 204$b$ is determined to be the maximum value of the data elements of register 204, then the content of 204$b$ is stored as input maximum value 208 and "010" is stored in index bits 220. While the index bits pinpoint the location of individual data elements 204$a$-204$d$ within register 204, an address of the data elements may be calculated by adding the index bits 220 to the address of register 204. In FIG. 2, register 214 contains the address of register 204. Accordingly, in one implementation, the input maximum address 212 of input maximum value 208 may be formed as shown in FIG. 2, by selecting the most significant bits of register 214, and appending the index bits 220 to the least significant portion of input maximum address 212.

Next, the calculated input maximum value 208 is compared with reference maximum value 202$y$ stored in register 202. If the input maximum value 208 is greater than reference maximum value 202$y$, then input maximum value 208 is written to the output maximum value 218$y$ field of register 218. Correspondingly, mux 210 chooses input maximum address 212 of the input maximum value 208 to be written to the output maximum address 218$x$ field of register 218. If the input maximum value 208 is less than or equal to the reference maximum value 202$y$, the fields 218$x$ and 218$y$ of register 218 are replaced with the reference address 202$x$ and reference maximum value 202$y$ respectively.

Similar to register 202, register 218 may be either a single register or a register pair. It will be appreciated that the fields reference maximum address value 202$y$ and output maximum value 218$y$ may be efficiently contained in 16-bits in the above example, wherein each data element 204$a$-204$b$ is 16-bits wide. The size of corresponding address fields will depend on the addressing schemes used in system 200. Further, in exemplary embodiments, register 218 comprising the output maximum address 218$x$ and output maximum value 218$y$ may be set as register 202 comprising the reference address 202$x$ and reference maximum value 202$y$ respectively, for a next iteration or next instruction for fast minimum/maximum searching. Skilled persons will recognize efficient pipelining mechanisms and implementations of the data structures described in the above embodiments.

In the foregoing discussion of system 200, three stages of maximum value computation are involved: first, intermediate maximum values 206$a/b$ and 206$c/d$ are computed from the four data elements 204$a$-204$d$; second, input maximum value 208 is computed from intermediate maximum values 206$a/b$ and 206$c/d$; and third, output maximum value 218$y$ is computed from input maximum value 208 and reference maximum value 202$y$.

Figure 3:
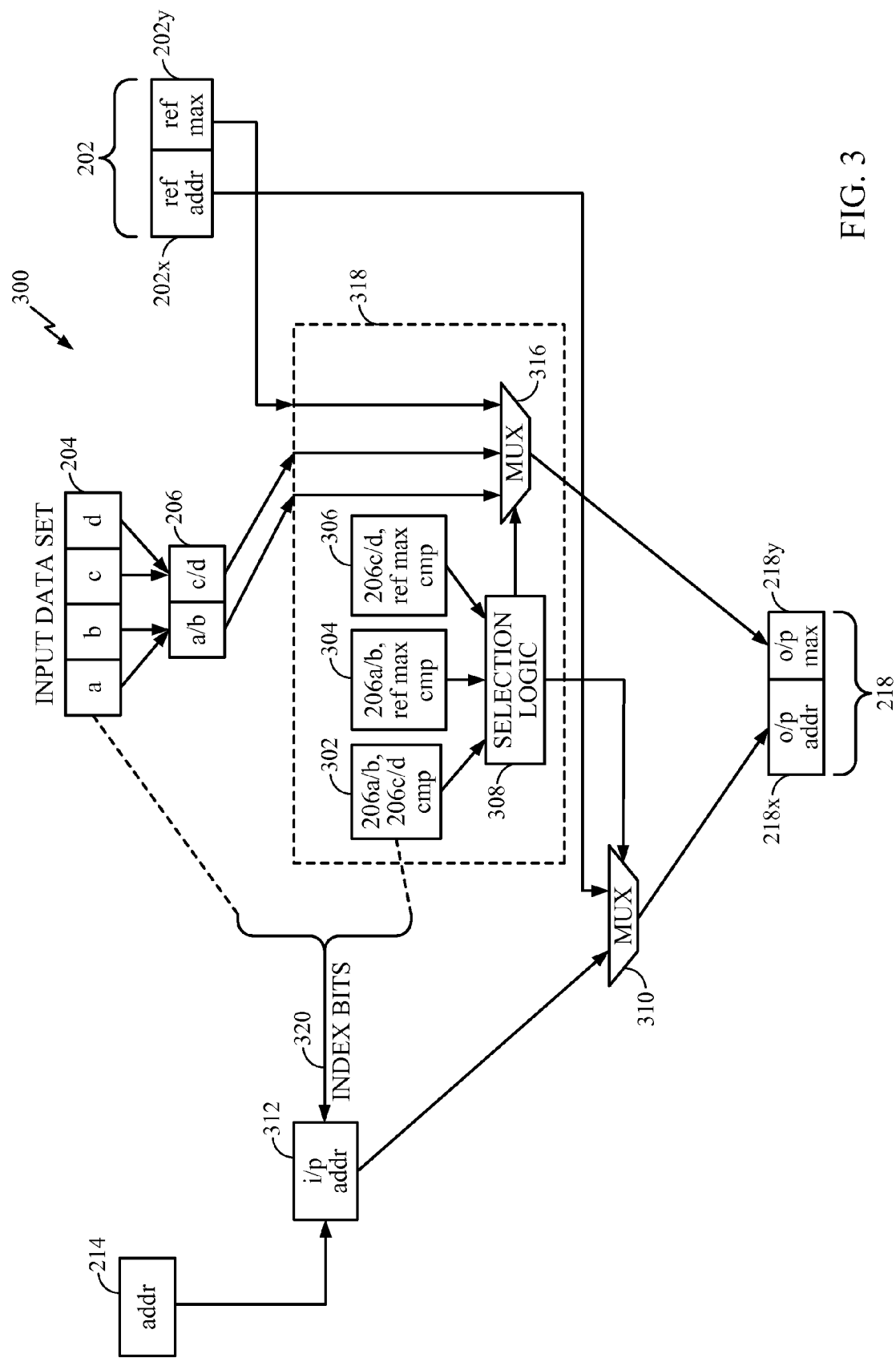
FIG. 3 is a schematic illustration of an alternative implementation of the maximum value searching function illustrated in FIG. 2.

With reference now to FIG. 3, there is shown system 300, which collapses the aforementioned second and third stages into a single stage, 318. To recall, the computation of a maximum value of two numbers involves comparison of the two numbers and selection of the maximum value based on the comparison. Accordingly, intermediate values 206$a/b$ and 206$c/d$ are compared against each other, while they are each compared with the reference maximum value 202$y$ in parallel. Based on the result of these three comparisons, the maximum value of the three values: intermediate value 206a/b, intermediate value 206c/d and reference maximum value 202y, are selected by a 3:1 multiplexer in a single stage, thus reducing the number of stages of computation before arriving at the output maximum value 218y.

As shown in FIG. 3, comparators 302, 304 and 306 (implemented for example, using adders) perform comparisons of {intermediate value 206a/b, intermediate value 206c/d}, {intermediate value 206a/b, reference maximum value 202y} and {intermediate value 206c/d, reference maximum value 202y} respectively. Results of these comparisons (for example, sign bits of differences) are fed into selection logic 308. Selection logic 308 appropriately controls mux 316 to select the output maximum value 218y. For example, if the result of comparator 302 reveals intermediate value 206a/b as the maximum value, then the result of comparator 304 determines the output maximum value 218y.

Once the result of comparator 302 becomes available, index bits 320 may be configured to reflect the input address 312 of the appropriate intermediate maximum value 206a/b or 206c/d. Mux 310 is controlled by selection logic 308 to pick the output address 218x from one of the input address 312 and the reference address 202x. Thus, parallel to stage 318, the output address 218x is also computed, in order to become available along with the output maximum value 218y. It will be understood of course, that the values of register 218 are the same in system 200 and system 300. System 300 reduces the latency of system 200 at the expense of adding an extra comparator.

Moreover, as disclosed previously, it will be appreciated that the disclosed techniques can be easily extended to instructions for searching minimum values instead of maximum values. The entire operation of the disclosed minimum/maximum searching instructions as described above, with reference to systems 200 and 300, may also be implemented in a single instruction cycle. For example, multithreaded processing systems may advantageously provide long latencies in the order of several system clock cycles for each thread. In an exemplary interleaved multithreaded processing system supporting six threads, an instruction cycle on one thread may span six system clock cycles. Therefore, disclosed minimum/maximum operations may be performed in a single instruction cycle of one thread, with execution spanned over six system clock cycles.

Further, it will be appreciated that the disclosed techniques are not restricted to any particular data format. For example, data elements 204a-204d may be of signed or unsigned formats. Similarly, the minimum/maximum values may be calculated for cases wherein only the absolute value (i.e. magnitude) of the data values may be of interest, and the sign of the operands may be irrelevant. Further, it will be readily recognized that disclosed embodiments may be tailored for specific formats of outputting the location identifier or address of the occurrence of a global minimum/maximum value in an array, by using the index bits 220 and address bits 214.

Figure 4:
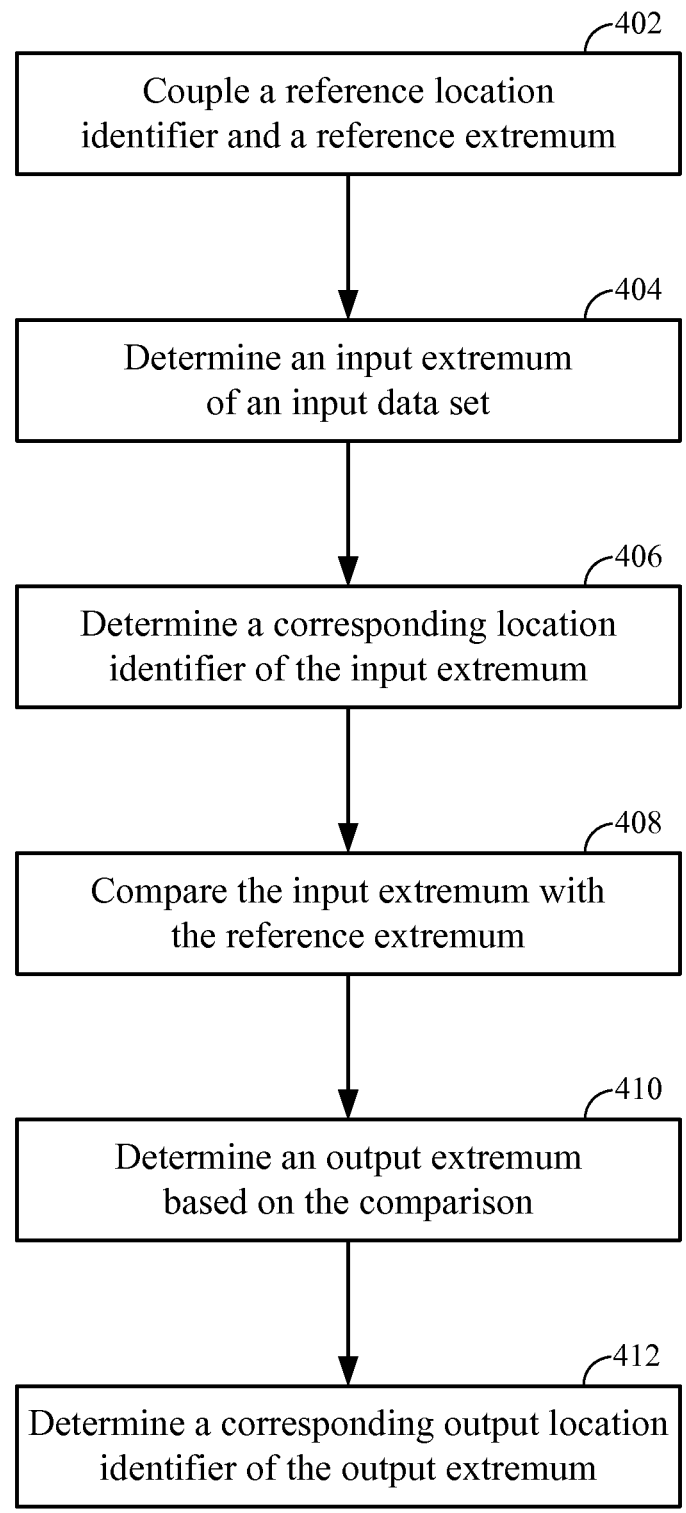
FIG. 4 is a flow chart illustrating a sequence of steps associated with extreme value searching operations in exemplary embodiments.

It will also be appreciated that embodiments include various methods for performing the processes, functions and/or algorithms disclosed herein. For example, as illustrated in FIG. 4, an embodiment can include a method of coupling a reference location identifier and a reference extremum (Block 402); determining an input extremum of an input data set (Block 404); determining a corresponding location identifier of the input extremum (Block 406); comparing the input extremum with the reference extremum (Block 408); determining an output extremum, as one of the input extremum and the reference extremum, based on the comparison (Block 410); and determining a corresponding output location identifier of the output extremum (Block 412).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a fast minimum/maximum searching instruction. Further, it will be appreciated that the various embodiments are not limited to illustrated examples and any means for performing the functionality described herein are included in embodiments of the invention.

While the foregoing disclosure shows illustrative embodiments, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the various embodiments may be described or claimed in the singular, the plural is contemplated unless limitation to the singular is explicitly stated.

What is claimed is:

1. A method of determining an extremum in a processing system, the method comprising:
    storing a reference location identifier and a reference extremum in a storage medium;
    receiving an input data set comprising two or more data elements from a memory system;
    determining an input extremum of the two or more data elements of the input data set;

determining a corresponding location identifier of the input extremum; and comparing the input extremum with the reference extremum to determine an output extremum and output location identifier, based on the comparison.

2. The method of claim 1, further comprising:
replacing the reference extremum and the reference location identifier, with the output extremum and the output location identifier, respectively.

3. The method of claim 1, wherein the output extremum is determined to be the input extremum if the input extremum is less than the reference extremum.

4. The method of claim 1, wherein the output extremum is determined to be the input extremum if the input extremum is greater than the reference extremum.

5. The method of claim 1, wherein the extremum is one of a minimum or a maximum.

6. The method of claim 1, wherein the input data set comprises data represented in one of a signed format or an unsigned format.

7. The method of claim 1, wherein determining the input extremum is based on a magnitude of data in the input data set.

8. The method of claim 1, further comprising coupling the reference location identifier and the reference extremum in a register pair.

9. The method of claim 1, further comprising: coupling the output location identifier and the output extremum in a register pair.

10. The method of claim 1 wherein determining the input extremum of the input data set comprises a pair-wise tree reduction of the input data set.

11. The method of claim 1, wherein the location identifier of the input extremum comprises an address portion and an index portion, wherein the address portion is formed from an address of the input data set, and the index portion is formed from a location of the input extremum within the input data set.

12. The method of claim 1, wherein determining the input extremum of the input data set is performed in parallel with comparing the input extremum with the reference extremum.

13. A processing system comprising:
a reference extremum stored in a storage medium;
a reference location identifier of the reference extremum stored in the storage medium;
an input data set comprising two or more data elements stored in a memory system;
logic configured to retrieve the input data set from the memory system and determine an input extremum, as the extremum of the two or more data elements of the input data set;
logic configured to determine an input location identifier as a location identifier of the input extremum; and
logic configured to compare the input extremum with the reference extremum to determine an output extremum.

14. The processing system of claim 13, further comprising:
logic configured to select one of the input location identifier and the reference location identifier as an output location identifier, based on the comparison.

15. The processing system of claim 13, wherein the reference extremum and reference location identifier are determined from a previous output extremum and a previous output location identifier, respectively.

16. The processing system of claim 13, wherein the output extremum is determined to be the input extremum if the input extremum is less than the reference extremum.

17. The processing system of claim 13, wherein the output extremum is determined to be the input extremum if the input extremum is greater than the reference extremum.

18. The processing system of claim 13, wherein the extremum is one of a minimum or a maximum.

19. The processing system of claim 13, wherein the input data set comprises data represented in one of a signed format or an unsigned format.

20. The processing system of claim 13, wherein the input data set is derived from a memory array.

21. The processing system of claim 13, wherein the logic configured to determine an input location identifier as the location identifier of the input extremum comprises logic for pair-wise comparison and tree-reduction of elements of the input data set.

22. The processing system of claim 13, wherein the location identifier of the input extremum comprises an address portion and an index portion, wherein the address portion is formed from an address of the input data set, and the index portion is formed from a location of the input extremum within the input data set.

23. The processing system of claim 13, wherein the determination of the input extremum of the input data set and the comparison of the input extremum with the reference extremum are performed in parallel.

24. An apparatus for determining an extremum comprising:
means for coupling a reference location identifier and a reference extremum;
means for determining an input extremum of an input data set;
means for determining a corresponding location identifier of the input extremum; and
means for comparing the input extremum with the reference extremum to determine an output extremum and output location identifier, based on the comparison.

25. The apparatus of claim 24, further comprising means for replacing the reference extremum and the reference location identifier, with the output extremum and the output location identifier, respectively.

26. The apparatus of claim 24, comprising means for determining the input extremum of an input data set in parallel with comparing the input extremum with the reference extremum.

27. A non-transitory computer readable storage medium comprising instructions, which when executed by a processor, causes the processor to perform operations for determining an extremum of an input data set comprising two or more data elements, wherein the instructions are operable to:
receive a reference location identifier and a reference extremum from a storage medium;
receive the input data set from a memory system;
determine an input extremum of the two or more data elements of the input data set;
determine a corresponding location identifier of the input extremum; and
compare the input extremum with the reference extremum to determine an output extremum and output location identifier, based on the comparison.

28. The non-transitory computer readable storage medium of claim 27, wherein the instructions are further operable to replace the reference extremum and the reference location identifier, with the output extremum and the output location identifier, respectively.

29. The non-transitory computer readable storage medium of claim 27, wherein the instructions are further operable to determine the input extremum of an input data set in parallel with comparing the input extremum with the reference extremum.

\* \* \* \* \*